United States Patent [19]

Ellis et al.

[11] Patent Number: 5,581,690
[45] Date of Patent: Dec. 3, 1996

[54] METHOD AND APPARATUS FOR PREVENTING THE USE OF CORRUPT DATA IN A MULTIPLE DISK RAID ORGANIZED STORAGE SYSTEM

[75] Inventors: Robert A. Ellis, Woodland Park; David W. Thiel, Colorado Springs, both of Colo.

[73] Assignee: Digital Equipment Corporation, Maynard, Mass.

[21] Appl. No.: 497,566

[22] Filed: Jun. 28, 1995

Related U.S. Application Data

[63] Continuation of Ser. No. 84,880, Jun. 29, 1993, abandoned.
[51] Int. Cl.$^6$ .................................................... G06F 11/00
[52] U.S. Cl. .............................. 395/182.04; 395/182.05
[58] Field of Search ............................ 371/66, 10.1, 12; 395/182.03, 182.04, 182.05

[56] References Cited

U.S. PATENT DOCUMENTS

| | | | |
|---|---|---|---|
| 4,092,732 | 5/1978 | Ouchi | 364/900 |
| 4,434,487 | 2/1984 | Rubinson et al. | 371/10 |
| 4,775,978 | 10/1988 | Hartness | 371/38 |
| 4,914,656 | 4/1990 | Dunphy et al. | |
| 4,989,205 | 1/1991 | Dunphy et al. | 371/10.1 |
| 4,989,206 | 1/1991 | Dunphy et al. | |
| 5,088,081 | 2/1992 | Farr | 369/54 |
| 5,166,936 | 11/1992 | Ewert et al. | 371/21.6 |
| 5,195,100 | 3/1993 | Katz et al. | 371/66 |
| 5,208,813 | 5/1993 | Stallmo | 371/10.1 |
| 5,255,270 | 9/1993 | Yanai et al. | |
| 5,261,084 | 11/1993 | Hashiguchi et al. | 395/575 |
| 5,504,858 | 4/1996 | Ellis et al. | 395/182.04 |

OTHER PUBLICATIONS

*A Case for Redundant Array of Inexpensive Disks (RAID)*, David A. Patterson, Garth Gibson, Randy H. Katz, Report No. UCB/CSD 87/391, Dec., 1987, Computer Science Division (EECS), University of California, Berkeley, CA 94720.

*A Case for Redundant Arrays of Inexpensive Disks (RAID)*, David A. Patterson, Garth Gibson, and Randy H. Katz, ACM SIGMOD Conference—Jun. 1–3, 1988, Chicago, Illinois.

*Two Papers on RAIDs*, Peter Chen, Garth Gibson, Randy H. Katz, David A. Patterson, Martin Schulze, Report No. UCB/CSD 88/479, Dec., 1988, Computer Science Division (EECS), University of California, Berkeley, CA 94720.

*An Introduction to RAID—Redundant Arrays of Inexpensive Disks*, Peter McLean, Apr. 24, 1991, Digital Equipment Corporation—CX01-2/N26.

*Software and Performance Issues in the Implementation of a RAID Prototype*, Edward K. Lee, Report No. UCB/CSD 90/573, May 1990, Computer Science Division (EECS), University of California, Berkeley, CA 94720.

*A Queuing Analysis of RAID Architectures*, Schenze Chen and Don Towsley, COINS Tech. Report 91–71, Department of Computer and Information Science, University of Massachusetts, Amherst, MA 01003.

*The Digital Guide to RAID Storage Technology*, 1992, Digital Equipment Corporation.

Primary Examiner—Robert W. Beausoliel, Jr.
Assistant Examiner—Norman M. Wright
Attorney, Agent, or Firm—Arthur W. Fisher; Ronald C. Hudgens

[57] ABSTRACT

A storage system having a plurality of disks arranged into a RAID array and a logging process and apparatus that identifies corrupt or invalid data and which prevents the corrupt or invalid data from being sent to a user application or used in any computations internal to the functioning of the array. In the preferred embodiment, a plurality of status bits, each having a first and second state are associated with each data block and parity block. If the status bit indicates that the block may contain corrupt or invalid information then that block is not used in regenerating data for an unavailable block or sent to a user application upon a read request.

8 Claims, 5 Drawing Sheets

METHOD AND APPARATUS FOR PREVENTING THE USE OF CORRUPT DATA IN A MULTIPLE DISK RAID ORGANIZED STORAGE SYSTEM

This application is a continuation of application Ser. No. 08/084,880, filed Jun. 29, 1993, now abandoned.

FIELD OF THE INVENTION

Storage systems using RAID-4 or RAID-5 organizations are vulnerable to undetected corrupt data. If a disk in the RAID array fails, or if a data block is unreadable, the unavailable data is regenerated by using the Exclusive-OR function with the parity and data in the associated blocks. The regenerated data is written back to the failed disk or data block in an effort to repair it. In the process of regeneration, if one of the needed data blocks or parity block is unreadable, the resulting regenerated data does not accurately correspond to the unavailable data and in this regard the regenerated data is corrupt or meaningless. If this regenerated data is sent to the user, the fact that the data is corrupt is undetected. If the regenerated corrupt data is written at the unavailable data block in a repair operation, the data at that block location is meaningless and the corruption is undetected. A subsequent read operation to that reconstructed data block will read the corrupt data. The same situation results if a write operation is unsuccessful and the data written to a particular block is inaccurate or meaningless. The written data is accordingly corrupt and the corruption is undetectable by a subsequent read operation to the same data block. The present invention comprises a logging process and apparatus that identifies meaningless or corrupt regenerated or written data by setting a bit associated with the block to a first state and sends an error signal in response to subsequent read operations to that data block, thereby preventing corrupt data from being used.

BACKGROUND OF THE INVENTION

RAID (Redundant Array of Independent/Inexpensive Disks) is an organization of data on a plurality of disks and, as is well known, has several levels, each of which has different characteristics that affect performance and availability. RAID level 4 (RAID-4) and RAID level 5 (RAID-5) are organizations of an array of n+1 disks that provide enhanced performance through the use of striping and enhanced data availability through the association of a parity block with every n data blocks. The data and parity information is distributed over the n+1 disks. In the RAID-4 organization, all parity data is on a single disk and in the RAID-5 organization, parity data is distributed over all of the disks in the array. The ensemble of n+1 disks appears to the user as a single, more highly available virtual disk.

RAID storage systems can be implemented in hardware or software. In the hardware implementation the RAID algorithms are built into a controller that connects to the computer I/O bus. In the software implementation the RAID algorithms are incorporated into software that runs on the main processor in conjunction with the operating system. In addition, the software implementation can be affected through software running on a well known RAID controller. Both the hardware and software implementations of RAID are well known to those of ordinary skill in the field.

Since RAID-4 and RAID-5 are organizations of data in which the data and parity information is distributed over the n+1 disks in the RAID array, if a single disk fails or if a data block is unreadable, all of the unavailable data can be recovered. A block is the smallest unit of data that can be read or written to a disk. Each disk in the RAID array is referred to as a member of the array. Furthermore, while disks are referred to throughout, any equivalent storage media could be used as would be apparent to one of ordinary skill in the field. RAID-4 is a level of organization of data for a RAID array where data blocks are organized into chunks which are interleaved among the disks and protected by parity and all of the parity is written on a single disk. RAID-5 is a level of organization of data for a RAID array where data blocks are organized into chunks which are interleaved among the disks and protected by parity and the parity information is distributed over all of the disks in the array. A chunk is a group of consecutively numbered blocks that are placed consecutively on a single disk before placing blocks on a different disk. Thus, a chunk is the unit of data interleaving for a RAID array.

The contents of each bit of the parity block is the Exclusive-OR of the corresponding bit in each of the n corresponding data blocks. In the event of the failure of a single disk in the array, the data from a given data block on the failed disk is recovered by computing the Exclusive-OR of the contents of the corresponding parity block and the n−1 data blocks on the surviving disks that contributed to that parity block. The same procedure is followed if a single block or group of blocks is unavailable or unreadable. A block or set of block is repaired by writing the regenerated dam. The regeneration and repair of data for a data block or set of data blocks on a disk in a RAID array is referred to as reconstruction.

There are several circumstances where the data on one of the disks in the array must be regenerated from the remaining disks. The first circumstance is when a disk has failed and it is replaced with a substitute disk which initially contains no data. The second circumstance is when a data block or group of blocks on one of the disks in the array is unreadable and the data and parity information on the remaining disks in the array is used to regenerate the unavailable data and repair the data block or group of data blocks by writing the regenerated data. The third circumstance occurs when computing the contents of parity blocks during certain write operations that operate by reading some of the disks in a RAID-5 array.

In the above situations, if one or more of the data or parity blocks needed in the regeneration are themselves not readable because of an electrical, magnetic or mechanical anomaly affecting that portion of the data, then there is no correctly regenerated data available to write to the unavailable block. Some RAID-4 or RAID-5 organizations may ignore this problem and simply write a meaningless pattern of bits to the unavailable data block as the regenerated data. If appropriate, the meaningless data just regenerated may be sent to the user with an error signal but a subsequent read to the data block will not detect that data is corrupt. The same situation results if a write operation is unsuccessful and the data written to the particular block is inaccurate or meaningless. The written data is accordingly corrupt and the corruption is undetectable. If the contents of the block now containing meaningless data, regardless of how the data has been corrupted, is ever returned to the user application as the result of a subsequent read request or used as an input to any computations internal to the functioning of the array whose results are subsequently returned to the user as the result of a read request, undetected data corruption occurs. Accordingly, it is desirable to identify if a data block is repaired by writing regenerated data that is meaningless or otherwise contains meaningless data and to prevent the meaningless data from being read by the user or subsequently being used in computations internal to the functioning of the array.

SUMMARY OF THE INVENTION

The present invention is a logging process and apparatus that identifies individual blocks or groups of blocks in a disk of a storage system using a RAID-4 or RAID-5 organization that contain meaningless data since the proper data cannot be regenerated using the standard RAID algorithms. The invention prevents the meaningless data from being provided to a user application either after regeneration or as the result of a subsequent read operation and prevents the meaningless data from being used in any computations internal to the functioning of the array. Thus, the data integrity of the RAID array is preserved and the use of undetected corrupt data is prevented.

A number of blocks on each disk in the RAID-4 or RAID-5 array is allocated for storing status bits. In the preferred embodiment, one status bit is stored for every data or parity block on the disk. In an alternative embodiment, one status bit corresponds to a group of parity or data blocks. In another embodiment, the status information comprises a list of the block numbers of each parity or data block that may contain invalid information. In other alternatives, the status information can be encoded or mapped in different ways to represent the parity or data blocks which may contain invalid information. In the preferred embodiment, if the status bit is in a first or set state, the data on the associated block is invalid or meaningless. If the status bit is in a second or clear state, the data on the associated block is valid. The status bit associated with a block on a disk in the RAID array is in the set state when the data block is unavailable and the attempt to regenerate the unavailable data and repair the data block is unsuccessful or a write to the block is unsuccessful.

Each read operation to a block on a disk in the RAID array includes checking the corresponding status bit. If the status bit is in the clear state the read operation proceeds normally. If the status bit is in the set state, the contents of the data block are meaningless, invalid or corrupt and are neither sent to the user application initiating the read nor used in computation internal to the functioning of the array. Instead an error signal is returned to the user or client application initiating the read operation.

Each write operation to a block on a disk in the RAID array includes checking the status bit. Of course, reading the status bit requires a disk read operation unless the status bits are stored in a cache as described hereinafter. If the corresponding status bit is in the clear state, the write operation proceeds normally with the new data being written to the data block. If the write operation succeeds, then a success signal is sent to the user. If the write operation fails, the status bit is set and an error signal is sent to the user. If the corresponding status bit is in the set state, the new data is written to the data block and if the write fails then an error signal is sent to the user. However, if the write succeeds, then the status bit is cleared. If the status bit cannot be cleared the write operation is considered a failure and an error or write failure signal is returned to the user or client application initiating the write operation. If the status bit is cleared, then a write success signal is sent to the user. Of course, setting or clearing the status bit requires a disk write operation.

Since in the normal operation of the storage system using the RAID-4 or RAID-5 organization the status bits seldom change states and have a low information content because most are in the clear state, all of the status bits of a disk of the array are stored in a contiguous set of blocks allocated on the disk and in the preferred embodiment also stored in a cache memory associated with the disk. The use of high performance cache memories to store the status bits improves access time.

BRIEF DESCRIPTION OF THE DRAWINGS

Other advantages of the invention will become apparent upon reading the following detailed description and upon reference to the accompanying drawings, in which.

Figure 1:
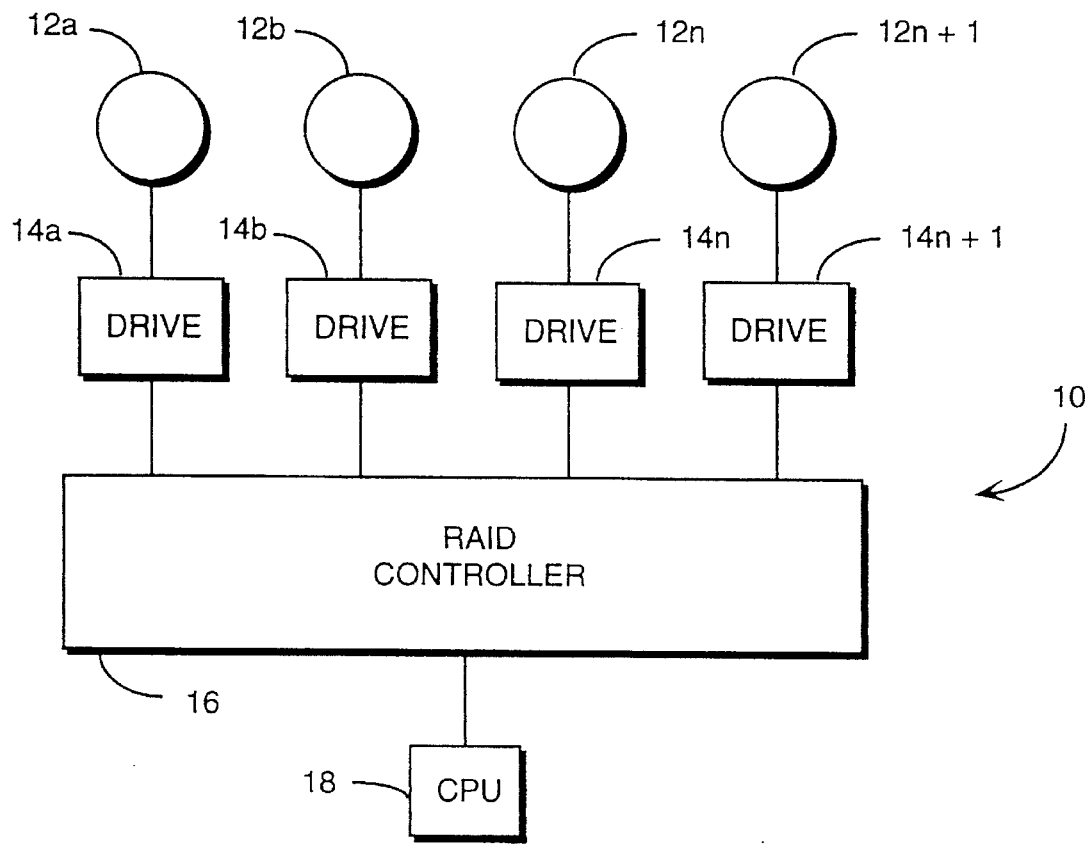
FIG. 1 is a data storage system using a RAID organization according to the present invention.

While the invention is susceptible to various modifications and alternative forms, for example, the invention can be adapted for use in other RAID configurations such as RAID 1 and RAID 3, specific embodiments thereof have been shown by way of example in the drawings and will herein be described in detail. It should be understood, however, that the invention is not intended to be limited to the particular forms disclosed. On the contrary, the applicant's intention is to cover all modifications, equivalents, and alternatives falling within the spirit and scope of the invention as defined by the appended claims.

DETAILED DESCRIPTION OF THE DRAWINGS

FIG. 1 is an illustration of a storage system 10 in which an array of n+1 disks 12 and associated drives 14 are connected to a RAID controller 16. A user, such as CPU 18, gains access to the n+1 disks 12 via read commands and write commands. The n+1 disks 12 are arranged into either a RAID-4 or RAID-5 organization based upon the selection of the well known RAID algorithms implemented in the RAID controller 16. The present invention is also usable with a host based software implementation of a RAID controller.

RAID-4 and RAID-5 are closely related organizations of the n+1 disks 12 that provide enhanced performance through the use of striping and enhanced availability through the association of a parity block with every n data blocks. The data and parity information is distributed over the array of n+1 disks 12 so that if any single disk falls or otherwise becomes unavailable all of the data and/or parity information on the unavailable disk can be recovered. The same is true if a single block or group of blocks is unavailable. Throughout the detailed description any reference to a failed or unavailable disk is equally applicable to unreadable blocks or groups of blocks even though the entire disk is not unavailable. In the RAID-4 organization, all parity data is on a single disk and in the RAID-5 organization, the parity information is distributed over all of the disks in the array.

All access to the array of n+1 disks 12 is through the RAID controller 16 which is connected to a user such as CPU 18. A single CPU is shown but using a plurality of CPU's is well within the ability of someone of ordinary skill in the field. The RAID controller 16 contains the standard RAID algorithms and is well known to one of ordinary skill in the art.

The array of n+1 disks 12 appears as a single, more highly available virtual disk to a user. The contents of each bit of the parity block is the Exclusive-OR of the corresponding bit in each of the n corresponding data blocks. As is well known, other error correction codes can be used to establish the mathematical relationship between the data and parity information. In the event of the failure or unavailability of a single disk in the array of n+1 disks 12, the data from a given data block on the unavailable disk is regenerated by computing the Exclusive-OR of the contents of the corresponding parity block and the n−1 data blocks on the remaining disks in the array that contributed to that parity block. The unavailable data block, if possible, is repaired by writing the regenerated data. In this manner the entire unavailable disk is reconstructed by regenerating data and repairing data blocks. Of course, the unavailable disk can be removed and a replacement disk substituted and the regenerated data is then written on the replacement disk to bring the RAID array back to full redundant operation.

There are other circumstances where the data on one of the disks in the array must be regenerated from the remaining disks. One such circumstance occurs when a data block on one of the disks in the array is unreadable and the data and parity information on the remaining disks in the array is used to regenerate the unavailable data and repair the data block by writing the regenerated data. Another circumstance occurs when computing the contents of parity blocks during certain write operations that operate by reading some of the disks in a RAID-5 array.

In the above circumstances, if one or more of the data or parity blocks needed in the regeneration are themselves unavailable or unreadable because of an electrical, magnetic or mechanical anomaly affecting that portion of the data, then there is no correctly regenerated data available to write to the unavailable block. The regenerated data is accordingly a meaningless pattern of bits. Nevertheless, some RAID-4 or RAID-5 organized storage systems write the meaningless data to the data block. In addition, if appropriate, this meaningless data is sent to the user with an error signal but a subsequent read to the data block will not detect that the data is corrupt. As explained above, the same situation occurs if a write operation is unsuccessful and the data written to a particular block is inaccurate or meaningless. Furthermore, if the contents of the block containing the meaningless data is returned to a user as a result of a subsequent read request or used as an input to any computations internal to the functioning of the array whose results are subsequently returned to the user as the result of a read request, undetected corrupt data occurs.

Figure 2:
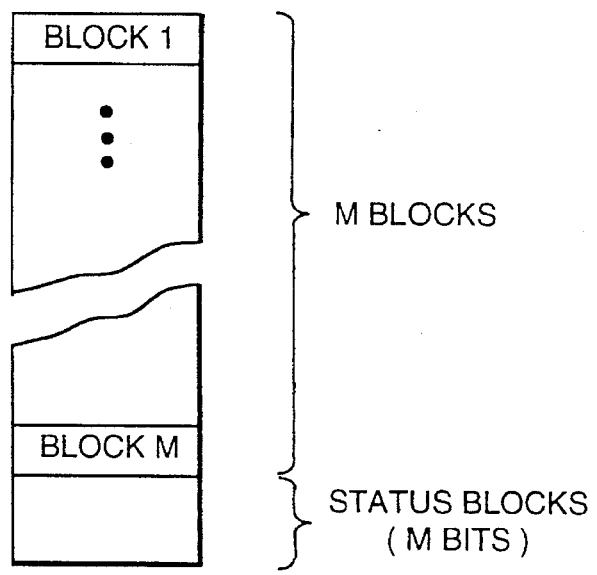
FIG. 2 is an illustration of the block structure of a disk in the RAID array including the status bits of the present invention.

FIG. 2 is one disk of a RAID array illustrated as a linear space of blocks. If there are M blocks on the disk for data and parity then enough blocks must be set aside to accommodate M status bits. While the blocks holding the status bits are illustrated at the last blocks of the disk, the status blocks can be located anywhere on the disk without departing from the present invention. For improved reliability, multiple copies of the status bits may be maintained. Each of the copies of the bits can be stored on the member disk whose blocks they describe in a contiguous set of blocks. If multiple copies of these bits are maintained, all changes to the state of a bit must be performed to all copies before the change of state is considered complete. If all copies of a bit are inaccessible, due to some set of failures, the corresponding block must be presumed to be invalid; if any copies of a bit are available, their logical-or describes the state of the corresponding block.

The preferred embodiment of the present invention is a logging process and apparatus which associates one bit with each individual block in each disk of the RAID array and places that bit in a first or set state when the data in the block is corrupt, meaningless or invalid and places that bit in a second or clear state when the data in the block is valid or accurate. In an alternative embodiment, one status bit corresponds to a group of parity or data blocks. In another embodiment, the status information comprises a list of the block numbers of each parity or data block that may contain invalid information. In other alternatives, the status information can be encoded or mapped in different ways to represent the parity or data blocks which may contain invalid information. In the preferred embodiment, the data in the block is meaningless, corrupt or invalid if it results from a regeneration operation that was unsuccessful or a write operation that was unsuccessful. The process prevents the corrupt data from being sent to an application user who initiates a read command or from being used in computations internal to the functioning of the array. A sufficient number of blocks on each member of the RAID array are allocated to contain one bit for every data or parity block or group of data or parity blocks. Since a common block size is 4096 bits, this represents an overhead of one part in 4096. Each bit describes one block or group of blocks on the disk. If the bit is in the set state, the data on the associated block is invalid. If the bit is in the clear state, the data on the associated block is valid.

Figure 3:
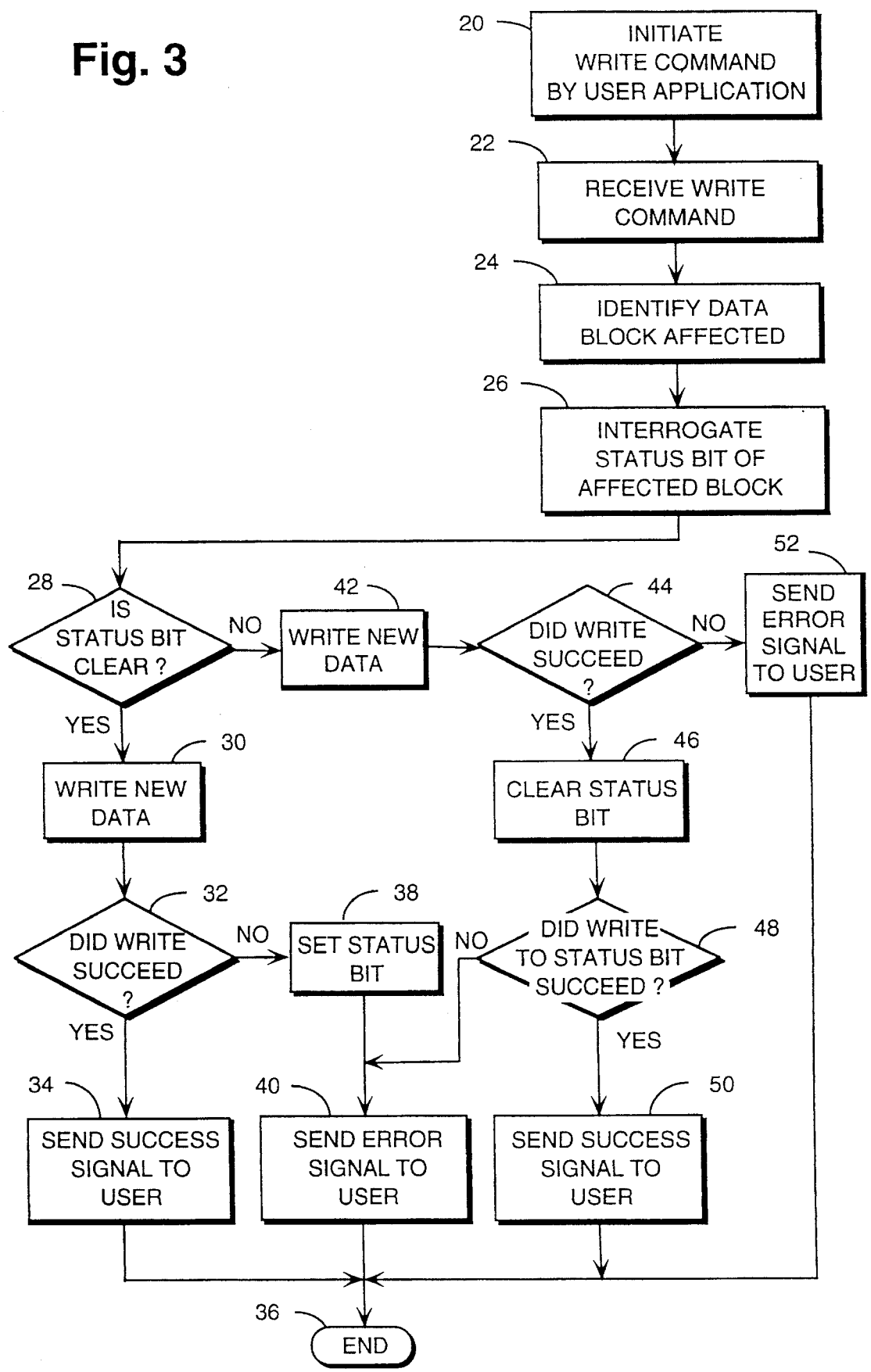
FIG. 3 is a flow chart illustrating a write operation according to the present invention.

FIG. 3 is a flow chart illustrating a write operation and the use of the status bits of the present invention. This flow chart describes a data write operation but the logic for a parity write operation is identical. The write operation is initiated by an application user represented at step 20. The write command is received at step 22 and the affected data block identified at step 24. The status bit of each affected data block is accessed at step 26. If a status bit is clear as determined at step 28, then the new data is written at step 30. If the write operation was successful as determined at step 32, then a success signal is sent to the user at step 34 and the process successfully ends at step 36. If the write operation was not successful as determined at step 32, the status bit is set at step 38 and an error signal is sent to the user at step 40 and the process unsuccessfully ends at step 36.

If the status bit is not clear as determined at step 28, the new data is written at step 42. If the write operation was successful as determined at step 44, then the status bit is placed in the clear state at step 46. Of course, setting or clearing the status bit requires a disk write operation. If the write to the status bit was successful as determined at step 48, then a success signal is sent to the user at step 50 and the process successfully ends at step 36. If the write to the status bit was unsuccessful as determined at step 48, then an error signal is sent to the user at step 40 and the process unsuccessfully ends at step 36. Finally, if the new data write operation was not successful as determined at step 44, then at step 52 an error signal is sent to the user and the process unsuccessfully ends at step 36. In this manner, a data block that contains meaningless data is flagged or identified and will not be used in subsequent read or regeneration operations to that block as described hereinafter.

Figure 4:
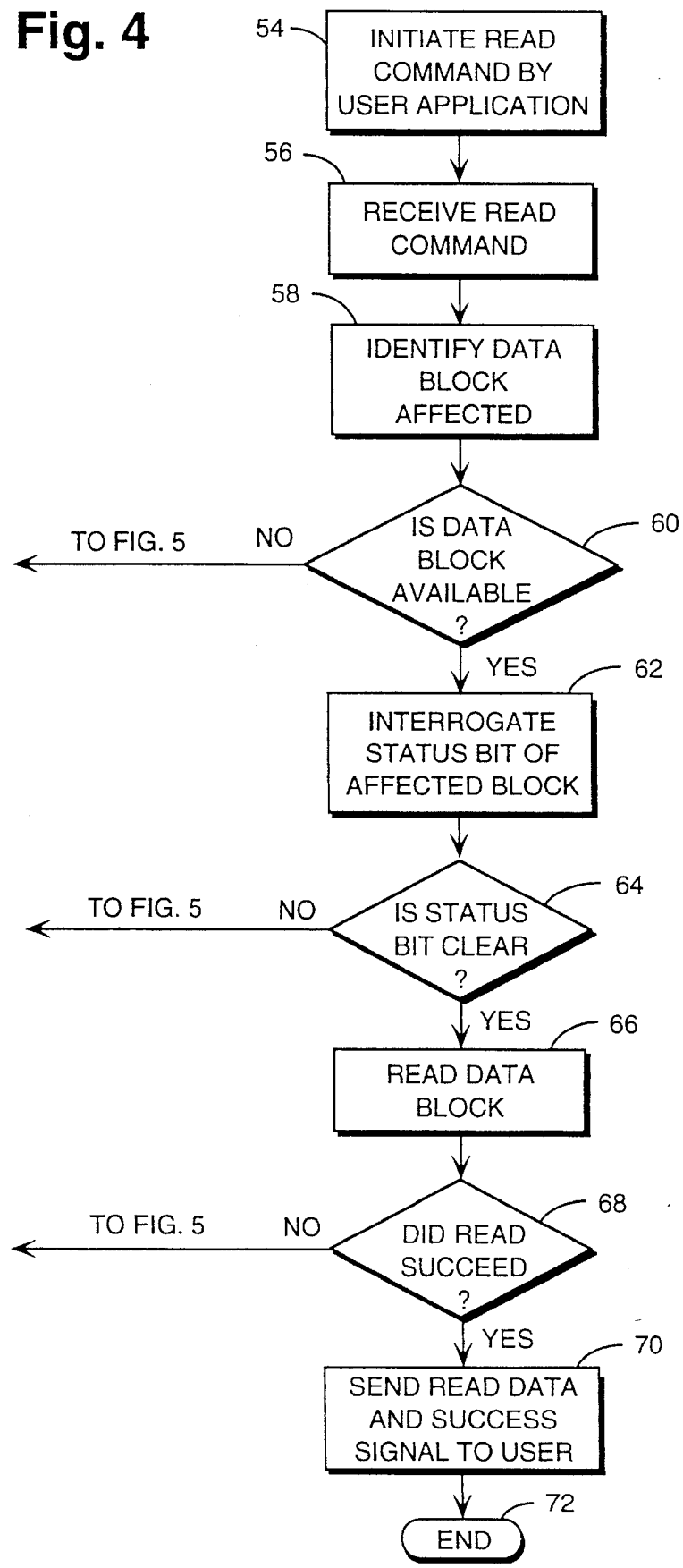
FIG. 4 is a flow chart illustrating a read operation according to the present invention.
Figure 5:
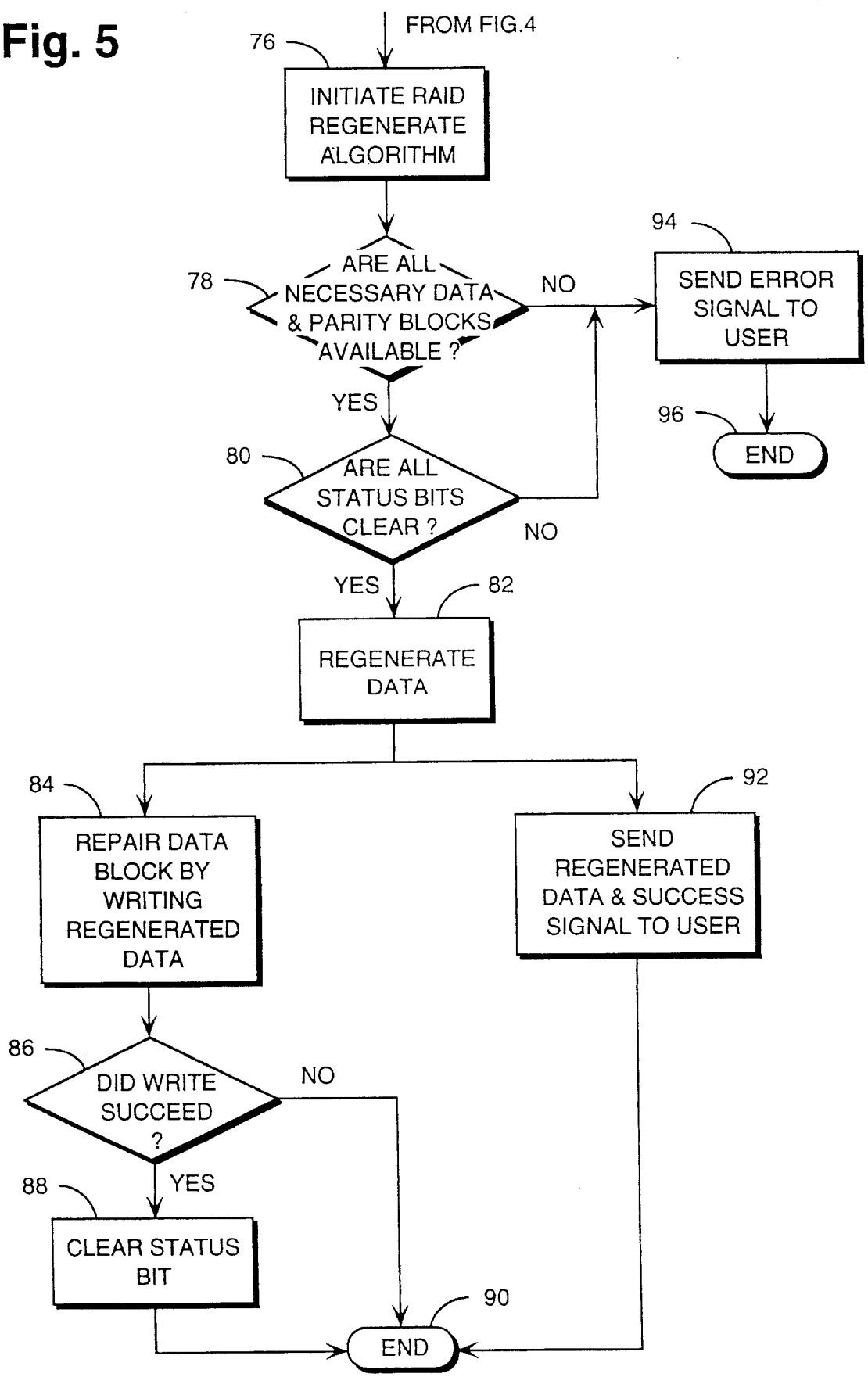
FIG. 5 is a flow chart illustrating a regeneration operation according to the present invention.

FIG. 4 is a flow chart illustrating a read operation and the use of the status bits of the present invention. A read command is initiated by the application user represented at step 54. The read command is received at step 56 and the affected or targeted data block is identified at step 58. If the identified data block to be read is unavailable as determined at step 60, then the regeneration procedure of FIG. 5 is initiated. If the identified data block is available as determined at step 60, then the status bit is interrogated at step 62. If the status bit is set as determined at step 64, then the process proceeds to FIG. 5. If the identified data block is available and the status bit is clear as determined at step 64, then the identified data block contains valid data and the identified data block is read at step 66. If the read was successful as determined at step 68, then at step 70 the read data and a success signal are sent to the user and the process successfully ends at step 72. If the read operation was not successful as determined at step 68 then the process proceeds to FIG. 5.

FIG. 5 is a flow chart illustrating the regeneration of data using the standard RAID algorithms and the use of the status bits of the present invention. The sequence of steps in FIG. 5 illustrate the situation when the one of the data blocks identified or targeted by the read request of FIG. 4 is unavailable as determined at step 60 or the status bit is set as determined at step 64 or the read operation is unsuccessful as determined at step 68. At step 76 the RAID algorithms for regeneration of unavailable data begin. In order to regenerate it is necessary that the Exclusive-OR function be used with the other data blocks and the parity block to which those data blocks contributed. At step 78 the availability of the necessary data blocks and party block is determined and at step 80 the status bits of these data blocks and parity block are checked to verify that the data is meaningful or valid. If all of the data blocks and the parity block are present and the status bits are clear, then the regeneration is completed at step 82. Of course, if the regeneration fails an error signal is sent to the end user and the process ends. If the regeneration is successful, then at step 84, the unavailable data block is repaired by writing to it the regenerated data. If the write succeeds as determined at step 86, the status bit is cleared at step 88 and the process successfully ends as step 90. Of course, setting or clearing the status bit requires a disk write operation. If the write is not successful as determined at step 86, the process ends at step 90. In addition, since the user is typically not concerned about the success of the repair of the data block, the request data including regenerated data and a read success signal is sent to the user at step 92 and the process successfully ends at step 90. If at step 78 one of the data blocks or the parity block necessary for regeneration is unavailable or unreadable, for example because of an electrical, magnetic or mechanical anomaly affecting that portion of the data, or because any of the status bits indicate that the data is invalid at step 80, an error signal is sent to the user application at step 94 and the read operation ends unsuccessfully at 96.

The flow charts of FIGS. 3, 4 and 5, as would be understood by someone of ordinary skill in the field, are equally applicable to alternative embodiments in which the status information is encoded or mapped in different ways to represent the parity blocks which may contain invalid information. For example, in the alternative embodiment in which the status information comprises a list of the block number of each parity or data block which may contain invalid information, then the operation of adding the block number for a parity or data block to the list corresponds to the above-described operation of setting the status bit to indicate that the corresponding parity or data block may contain invalid information. Similarly, the operation of removing the block number for a parity or data block from the list corresponds to the above-described operation of clearing the status bit. Of course, checking the status of the status bit in the preferred embodiment corresponds to checking the list in the alternative embodiment. Accordingly, the wording of the individual steps in the flow charts would change to correspond to the encoding of the status information but the fundamental operation remains the same.

Figure 6:
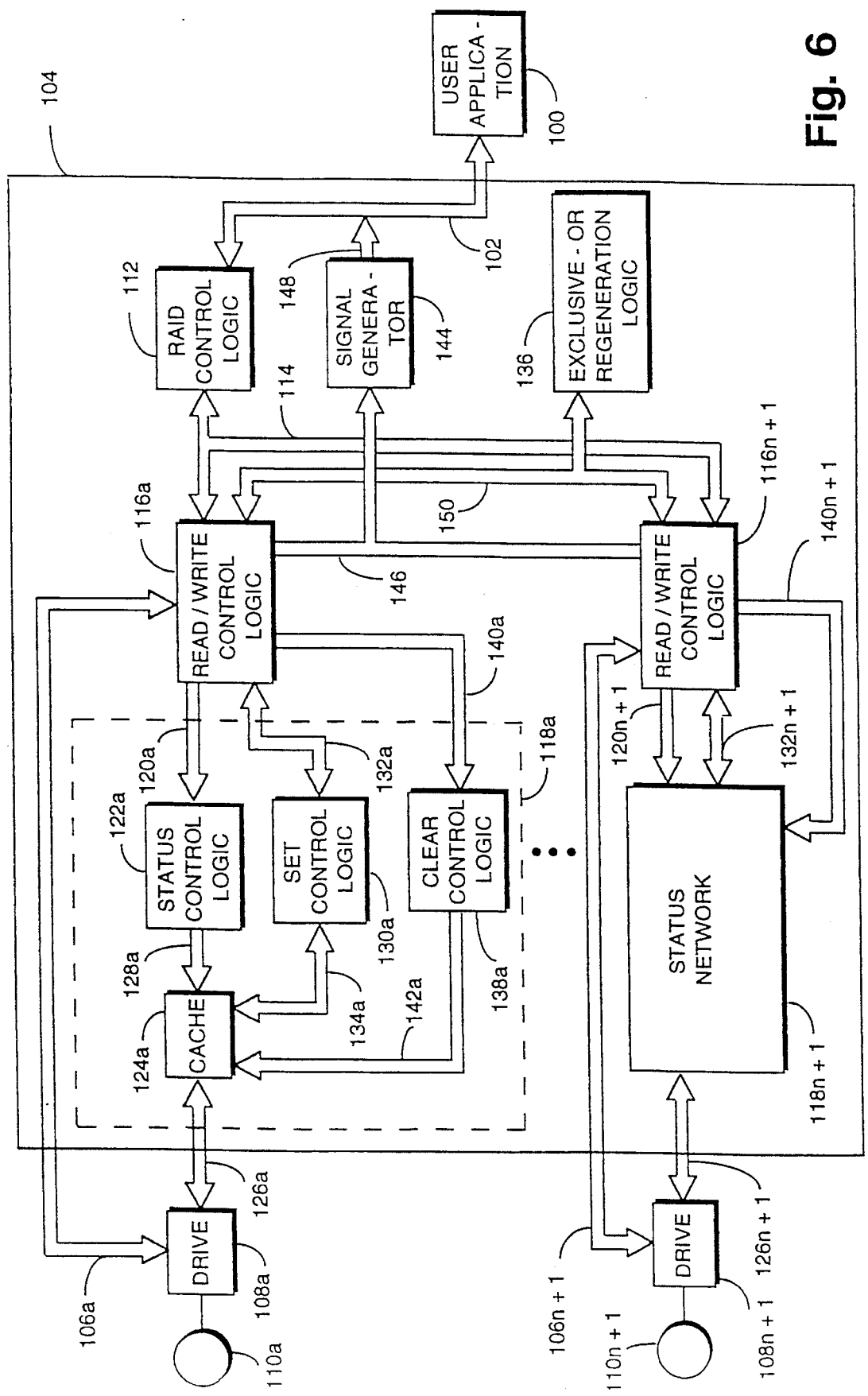
FIG. 6 is an illustration of a hardware implementation of the present invention.

FIG. 6 is a block diagram of a data storage system which uses a high performance volatile memory to store the status bits for each disk in the RAID array. A user application 100 sends a read or write command via bus 102 to the RAID controller 104. The RAID controller 104 sends control signals and data over control/data buses 106*a* through 106n+1 to a plurality of disk drives 108*a* through 108n+1 to position the read/write heads over the proper portion of the plurality of disks 110*a* through 110n+1. Furthermore, as is well understood by one of ordinary skill in the field, in a read operation the data read from the disks 110*a* through 110n+1 is passed over control/data buses 106*a* through 106n+1 through the RAID controller 104 and over request/data bus 102 to the user application 100.

A read request or command from user application 100 is sent via bus 102 to the RAID controller 104. The RAID control logic 112 identifies the data block affected and sends a signal to the appropriate read/write control logic 116*a* through 116n+1. The RAID control logic 112 is well known to those of ordinary skill in the field and accordingly not disclosed in detail herein. The appropriate disk drive 108*a* through 108n+1 reads the affected data blocks from disks 110*a* through 110n+1 as is well known to those of ordinary skill in the field. Each control logic 116*a* through 116n+1 comprises a plurality of logic gates arranged to provide the described outputs based upon the various inputs and the specific arrangement of logic gates is within the ability of one of ordinary skill in the field and a matter of design choice and is therefore not described further herein. Each read/write control logic 116*a* through 116n+1 is connected to a status network 118*a* through 118n+1. Each status network is identical and therefore only the status network 118*a* connected to read/write logic 116*a* is described in detail.

A control signal identifying the data blocks to be read is sent over bus 120*a* to the status logic control 122*a* which maps the identified data blocks to the appropriate address in cache 124*a*. The status bits are stored on disk as described above and also stored in a cache for easy access. Cache 124*a* is connected over bus 126*a* to drive 108*a* to send and receive data concerning the state of the status bits on disk 110*a* in a manner well known to those of ordinary skill in the field. Of course, each time the state of the status bits in cache 124*a* are changed, the status bits on disk 110*a* must be updated and the reverse is also necessary. If all of the status bits are clear the set control logic 130*a* signals read/write control logic 116*a* via bus 132*a* and the read data is sent to the user application as is well known in the field. If any one of the status bits is set or if any data block is unavailable, then set control logic 130*a* sends a signal to read/write control logic 116*a* and regeneration of the data block in the Exclusive-OR regeneration logic 136 is undertaken. Regeneration will not be successful if any of the needed data or parity blocks are unavailable or their status bits are set. In this case, signal generator 144 sends an error signal via 148 to the user application. If the regeneration is successful, the read data including regenerated data and a read success signal from signal generator 144 are sent to the user application 100 as is well known. In addition, the regenerated data block is written to disk and if the write operation is successful the read/write control logic 116*a* sends a signal over bus 140*a* to clear control logic 138*a* which sends a signal over bus 142*a* to cache 124*a* to clear the status bit for the regenerated data block. The corresponding status bits on disk 110*a* are also cleared. The status control logic 122*a*, the set control logic 130*a* and the clear control logic 138*a* comprise a plurality of logic gates that provide the described output based upon the various inputs as is within the ability of one of ordinary skill in the field and the particular arrangement of logic gates is a design choice and therefore not described further herein.

If a write request from user application 100 is received over request/data bus 102 by the RAID controller 104, the standard RAID control logic 112 receives the write request or command and determines the data blocks affected by the write operation. The RAID logic to perform this function is well known to those of ordinary skill in the field. This information is sent over control/data bus 114 to the read/write control logic 116*a* through 116n+1. Each read/write control logic 116*a* through 116n+1 is connected to a status network 118*a* through 118n+1. Each status network is identical and therefore only the status network 118*a* connected to read/write control logic 116*a* is described in detail.

A control signal identifying the data blocks affected by the write operation is sent over bus 120*a* to the status control logic 122*a* which maps the identified affected data blocks to the appropriate address in cache 124*a*. The status bits are stored on disk as described above and also stored in a cache for easy access. Cache 124*a* is connected over bus 126*a* to drive 108*a* to send and receive data concerning the state of the status bits on disk 110*a* in a manner well known to those of ordinary skill in the field. Of course, each time the state of the status bits in cache 124*a* are changed the status bits on disk 110*a* must be updated and the reverse is also necessary. The status logic control 122*a* is connected to the cache 124*a* via bus 128*a* to identify the affected data blocks. The read/write control logic 116*a* is connected to set control logic 130*a* via bus 132*a* to indicate that the operation being performed is a write. The set logic control 130*a* is connected to the cache 124*a* via bus 134*a*. If the status bits for the affected data blocks are clear a signal is sent from the set logic control 130*a* via bus 132*a* to read/write control logic 116*a*. New parity data is calculated at Exclusive-OR regeneration logic 136, written at the appropriate block on the disks 110 and new data from the user application 100 is written at the appropriate data blocks of the disk 110*a* and read/write control logic 116*a* sends a signal to signal generator 144 which sends a write success signal via bus 148 to application user 100, as is well known to those of ordinary skill in the field. If the write operation did not succeed, read/write control logic 116*a* sends a signal over bus 132*a* to set control logic 130*a* and a signal to generator 144. The set control logic 130*a* sends a signal over bus 134*a* to cache 124*a* to set the status bits. The signal generator 144 sends an error signal via bus 148 to user application 100.

If the status bit for one of the affected data or parity blocks is set, set control logic 130*a* sends a signal over bus 132*a* to the read/write control logic 116*a*. The new data from the user application 100 is now written at the appropriate data blocks, of the disk 110*a* as described above. If the write is unsuccessful, read/write control logic 116*a* sends a signal to generator 144 which sends an error signal via bus 148 to user application 100. If the write is successful, then read/write control logic 116*a* sends a signal to clear logic control 138*a* via bus 140*a*. The clear logic control 138*a* sends a signal via bus 142*a* to cache 124*a* to clear the status bits for the affected data blocks and the corresponding status bits on disk 110*a* are cleared. If the clearing of the status bits succeeded, read/write control logic 116*a* sends a signal to signal generator 144 which sends a write success signal to application 100 and the write operation ends successfully. If the clearing of the status bits failed, the read/write control logic 116*a* sends a signal to status signal generator 144 via bus 146 and generator 144 sends an error or write failure signal via bus 148 to the application user 100.

A logging process and apparatus that identifies regenerated or written data as meaningless or corrupt by setting a bit associated with the block to a first state and sends an error signal in response to subsequent read operations to that data block thereby preventing corrupt data from being used has been described. The invention prevents the meaningless data identified by the set bit associated with it from being provided to a user application either after regeneration or as a result of a subsequent read operation and prevents the meaningless data from being used in any computations internal to the functioning of the array. Thus, the use of undetected corrupt data is prevented. The status bits are stored on the same disk as the associated blocks and also in a cache for quick access.

What is claimed is:

1. In a storage system having n+1 disks organized in a RAID array, a plurality of data blocks, a plurality of parity blocks, each parity block associated with n data blocks and a plurality of status bits, each status bit having a first and second state, said status bit associated with one of said data blocks or parity blocks, said status bit in said first state indicates that said associated data or parity block may contain invalid information and said status bit in said second state indicates that said associated data or parity block contains valid information, a method of identifying data or parity blocks which contain invalid information and preventing said invalid information from being sent to a user application or used in any computations internal to the functioning of the array, comprising the steps of:

receiving from a user application a read request targeting at least one of said data blocks;

identifying said targeted data block and determining if said identified targeted data block is readable;

if said identified targeted data block is readable, identifying and interrogating the status bit associated therewith;

if said identified status bit is in said second state, reading said targeted data block;

determining if said read is successful;

if said read is successful, sending said read data to said user application; and if said targeted data block is unavailable for said read, then further comprising the steps of:

determining if all data and parity block necessary for regeneration are available;

determining if the status bits for all said data and parity blocks necessary for regeneration are in the said second state;

if all necessary blocks are available and all associated status bits are in said second state, regenerating the unavailable data, repairing the unavailable data block by writing the regenerated data;

if said write is successful, setting said status bit to said second state and sending the regenerated data to said user application; and if said write is unsuccessful, sending said regenerated data to said user application.

2. The method set forth in claim 1, wherein if any of said necessary blocks are unavailable or if any of said associated status bits are in said first state, sending an error to said user application.

3. The method set forth in claim 1, wherein if said identified status bit is in said first state, then further comprising the steps of:

determining if all data and parity blocks necessary for regeneration are available;

determining if the status bits for all said data and parity blocks necessary for regeneration are in said second state;

if all necessary blocks are available and all associated status bits are in said second state, regenerating the unavailable data, repairing the unavailable data block by writing the regenerated data;

if said write is successful, setting said status bit to said second state and sending the regenerated data to the user;

if said write is unsuccessful, sending said regenerated data to said user.

4. The method set forth in claim 3, wherein if any of said necessary blocks are unavailable or if any of said associated status bits are in said first state, sending an error signal to said user application.

5. The method set forth in claim 1, wherein if said read is unsuccessful, then further comprising the steps of:

determining if all data and parity blocks necessary for regeneration are available;

determining if the status bits for all said data and parity blocks necessary for regeneration are in said second state;

if all necessary blocks are available and all associated status bits are in said second state, regenerating the unavailable data, repairing the unavailable data block by writing the regenerated data;

if said write is successful, setting said status bit to said second state and sending the regenerated data to said user application;

if said write is unsuccessful, sending said regenerated data to said user application.

6. The method set forth in claim 5, wherein if any of said necessary blocks are unavailable or if any of said associated status bits are in said first state, sending an error signal to said user application.

7. In a storage system having n+1 disks arranged in a RAID array, a plurality of data blocks, a plurality of parity blocks, each parity block associated with n data blocks and a plurality of status bits, each status bit associated with one of said data blocks or said parity blocks, each status bit having a first state indicating that said associated block contains invalid information and a second state indicating that said associated block contains valid information, a method of preventing invalid information from being sent to a user application or used in any computations internal to the functioning of the array, comprising the steps of:

receiving from a user application a write request to at least one of said data blocks;

identifying the data block targeted by said write request;

determining the state of said status bit for said targeted data block;

if said status bit is in said second state indicating that the information is valid, writing the new data to said targeted data block;

if said write is successful, sending a write success signal to said user application, and if said write is unsuccessful, setting said status bit to said first state and sending a write failure signal to said user application;

if said status bit is in said first state indicating that the information is invalid, writing the new data to said targeted data block;

if said write is successful, clearing said status bit to said second state;

if said status bit is cleared to said second state, sending a write success signal to said user application; and if said status bit is not cleared to said second state, sending a write failure signal to said user application.

8. A storage system having n+1 disks organized in a RAID array, a plurality of data blocks, a plurality of parity blocks, each parity block associated with n data blocks and a plurality of status bits, each status bit having a first and second state, said bit associated with one of said data blocks or parity blocks, said status bit in said first state indicates that said associated data or parity block may contain invalid information and said status bit in said second state indicates that said associated data or parity block contains valid information, apparatus for identifying data or parity blocks which contain invalid information and preventing said invalid information from being sent to a user application or used in any computations internal to the functioning of the array, comprising:

means for receiving from a user application a read request to a last one of said data blocks and providing an output signal identifying said data block targeted by said read request;

read/write control logic means for identifying said target data block and providing a status output signal;

memory means containing said plurality of status bits;

status control logic means receiving said status output signal and connected to said memory for identifying the status bit state of said target block;

set control logic means connected to said memory means for providing a valid output signal when said status bit associated with said target data block is in said second state and an invalid output signal when said status bit associated with said target block is in said first state;

said read/write control logic means receiving said output signals from said set control logic means and connected to said disks, said read/write control logic means reading said target data block and sending said read data to said user application when said output signal is valid, said read/write control logic means determining if any data blocks and parity block necessary for regeneration are unavailable or any associated status bits are in said first state when said output signal is invalid, said read/write control logic means providing a regenerate error signal when any data blocks and parity block necessary for regeneration are unavailable or any associated status bits are in said first state, said read/write control logic means providing a regenerate signal when said data blocks and said parity block necessary for regeneration are available and said associated status bits are in said second state;

generator means responsive to said regenerate error signal for sending a read failure to said user application;

means for regenerating unavailable data blocks connected to said read/write control logic means, said regenerating means responsive to said regenerate signal for providing regenerated data to said read/write control logic means;

said read/write control logic means in response to said regenerated data writing said regenerated data to said target data block, sending said regenerated data to said user application and providing a clear control signal; and clear control logic means for receiving said clear control signal and connected to said memory means for setting the status bit associated with said target data block to said second state.

* * * * *